C. T. MASON.
IGNITION DYNAMO.
APPLICATION FILED MAR. 15, 1915.

1,189,374.

Patented July 4, 1916.

WITNESSES:
Edna Lister
Ronald E. Campbell

INVENTOR.
Charles T. Mason
BY
H. R. Van Deventer,
ATTORNEY.

UNITED STATES PATENT OFFICE.

CHARLES THOMAS MASON, OF SUMTER, SOUTH CAROLINA, ASSIGNOR, BY MESNE ASSIGNMENTS, TO SPLITDORF ELECTRICAL COMPANY, OF NEWARK, NEW JERSEY, A CORPORATION OF NEW JERSEY.

IGNITION-DYNAMO.

1,189,374.

Specification of Letters Patent. Patented July 4, 1916.

Application filed March 15, 1915. Serial No. 14,409.

*To all whom it may concern:*

Be it known that I, CHARLES THOMAS MASON, a citizen of the United States, residing at Sumter, in the county of Sumter and State of South Carolina, have invented certain new and useful Improvements in Ignition-Dynamos, of which the following is a specification, reference being had to the accompanying drawing.

My invention relates to ignition dynamos and particularly to those of the high tension type arranged for two cylinder engines, and has for its object the production of a machine which shall be highly efficient in operation and in which the distributing device shall be of simple and reliable construction.

A further object is to provide a compact machine of relatively small size, in which the operative parts—particularly those carrying the high tension current—will be inclosed and protected.

Some of the more prominent features of the present invention may be incorporated in any type of ignition dynamo having normally stationary generating windings, independent of the rotor, but for the sake of illustration, I show and describe these improvements in connection with a machine as disclosed in Patent No. 1,105,361 granted to me July 28th, 1914. In my said patent, I have shown and claimed a generator having a magnet, a coil carrying structure, a coil on said structure, and a rotor associated with the magnet and adapted to shift the flux therefrom alternately through the coil carrying structure, and generating coil, so as to produce reversal of flux therein. The generating coil and its supporting structure and pole pieces are adjustable for timing purposes, being movable about the axis of the rotor.

The present invention includes the elements just mentioned, and means for distributing the high tension current, including an improved method of connecting the high tension circuit from the coil to the distributer.

While I show and describe the dynamo arranged for two cylinders, it will be understood that more cylinders may be supplied by the simple addition of more terminals on the distributer. I also show an improved method of oiling this type of dynamo, and an improved method of incasing the working parts of same.

My invention is illustrated in the accompanying drawings, in which—

Figure 2:
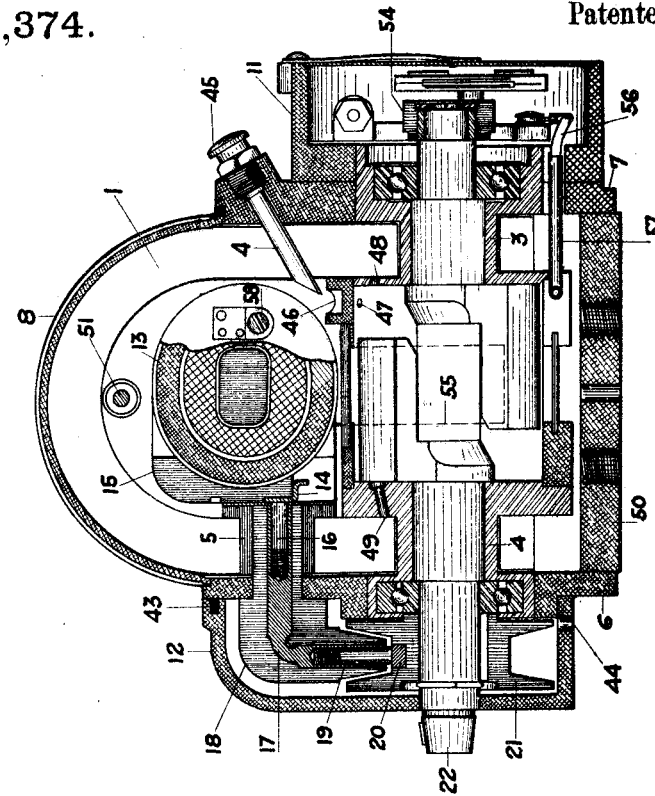
Figure 1:
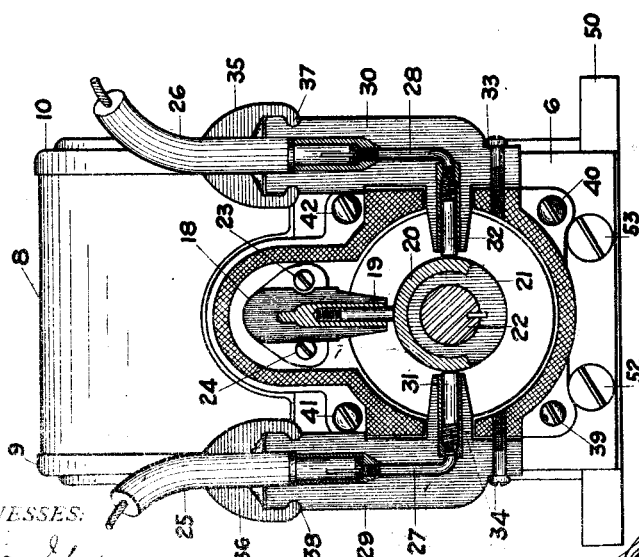

Figure 1 is an end view of the machine with certain of the distributer parts and casing in section, and Fig. 2, a side view with parts broken away and in section, to show the interior arrangement.

1 denotes a magnetic field structure, which may consist of one or more magnets bored out to accommodate the ends 2 and 3 of the coil carrying structure, the oil tube 4, and the insulating bushing 5. These magnets are insulating bushing 5. These magnets are held in position by means of the side plates 6 and 7, and the top cover plate 8. The open sides are closed by the side covers 9 and 10, which together with the interrupter case 11 and the distributer cover 12, constitute a complete closure for all parts of the machine.

The secondary winding 13 of the coil is connected to a terminal sector 14 carried on the insulating plate 15. 14 is in contact with a brush 16 carried in the metallic connecting piece 17 embedded in the insulation necting piece 17 embedded in the insulation 18. The lower end of 17 carries the brush 19 which bears against the segment 20 of the collector spool 21, carried on the rotor shaft 22. The insulation 18 is attached to the end plate 6 by means of screws 23 and 24, the inner end being positioned by the bushing 5.

The usual spark plug cables 25 and 26 terminate in suitable sockets connected to conductors 27 and 28, suitably supported in the insulation 29 and 30. 27 and 28 carry at their distributer ends, brushes 31 and 32 which contact upon the sector 20 of the distributer when same revolves. The insulating members 29 and 30, and the conductors carried thereby, form complete cable terminals, each one being attached to the distributer cover 12 in any suitable manner, such as the screws 33 and 34. Cables 25 and 26 are surrounded where they enter the terminals, by the soft rubber caps 35 and 36 which embrace grooves indicated at 37 and 38, thereby preventing the entrance of foreign substances.

To disassemble the distributer it is only necessary to remove the screws 33 and 34, by which the cable terminals are secured to the cover 12, then remove screws 39, 40, 41 and 42 and lift off cover 12. The screws 23 and 24 are then removed, permitting member 18 to be turned sidewise sufficiently to permit the end carrying brush 19 to be withdrawn from the V-shaped groove in the distributer spool 21, whereupon 18 may be withdrawn from the bushing 5. It will be seen that this operation does not break the high tension circuit anywhere except at the brushes through which it is normally carried; that there are no wires to disconnect, and that the danger of disarranging the insulation about the high tension conductor is eliminated. There are no threaded bushings to wear, or thin sections of insulation that are readily cracked by rough handling.

To eliminate the ingress of foreign substances to the distributer spool, the felt 43 is placed in a groove near the edge of the distributer cover, and to provide a drain for oil that might leak into the distributer housing from the rotor shaft bearing, the drain hole 44 is provided.

Oil is very essential to high speed magnetos of this type and I therefore provide the oil cup 45 communicating with the oil tube 4 which empties into the trough or channel 46 in the top of the coil carrying structure. This trough has a suitable opening 47 into the rotor housing. Oil admitted via tube 4, trough 46 and hole 47 to the rotor, passes through the holes 48 and 49, the plates 3 and 4 lubricates the shoulders of the coil carrying structure where it is supported in the magnets so that it will turn readily about the axis of the rotor for timing purposes. The oil may also work along the shaft and into the ball bearings so that the oil hole 45 serves to oil all moving parts of the machine requiring lubrication.

To provide easy access to the interior parts of the dynamo, it is only necessary to remove the screws (not shown) that hold the side cover plates 9 and 10 to the base 50, and then remove a through-bolt 51 which passes through both plates clamping same together, and to the magnets. The flanges on 9 and 10 hold the edges of the cover 8. The removal of these side plates permits the top cover plate 8 to be removed and the magnets may then be taken off. If it is desired to further disassemble the machine, the distributer cover may be taken off as previously described, the distributer spool 21 removed from the shaft, screws 52 and 53 removed from the end plate 6 and the end plate removed. This operation may be repeated with end plate 7 after removing the interrupter case 11, and the cam 54 from the rotor shaft.

By any suitable means attached to case 11, it, together with the coil carrying structure to which it is attached through the end 3 thereof, is movable about the axis of the rotor for timing purposes. The angular position of the poles shoes, one of which is indicated at 55, behind the rotor, is varied by this movement. At the same time, the continuity of the high tension circuit between the coil and distributer is not broken, the only movement taking place being between brush 16 and sector 14. Brush 19 on distributer sector 20 is not shifted at any time.

As the other circuits in a dynamo of this description are already well known, I will not describe same, but call attention to the method of connecting the primary circuit of the coil to the interrupter mechanism. This I accomplish by the conductor 56 inclosed in the tube 57 which is movable with the coil carrying structure, and which is positioned at the side thereof, the upper end of 56 being connected to terminal 58 on the coil.

The operation of a machine of this description being well known I do not describe same here. A description will be found in my prior patent hereinbefore mentioned.

From the foregoing description the advantages of my invention will be apparent to those skilled in the art especially as regards the compact arrangement of the various parts, their accessibility, the elimination of small insulating bushings and the provisions for proper lubrication; and while I have shown the preferred form of my invention, I wish it understood that all changes and modifications which do not depart from the spirit of the invention, are included within the scope of the appended claims.

Having thus described my invention, what I claim and desire to secure by Letters Patent, is:—

1. In an ignition dynamo, a magnet, a rotor and shaft therefor, a distributer on said rotor shaft, a coil carrying structure having poles spaced apart from said rotor and adapted to receive flux therefrom, a coil on said structure, and circuit connections between said coil and distributer.

2. In an ignition dynamo, a magnet, a rotor and shaft therefor, a distributer on said rotor shaft, a coil carrying structure adjustable about the axis of said rotor for timing purposes, a coil on said structure, and circuit connections between said coil and distributer.

3. In an ignition dynamo, a magnet, a rotor and shaft therefor, a distributer on said rotor shaft, a coil carrying structure, a coil on said structure, a circuit connection between said coil and distributer, and a contact adapted to connect with said distributer and thereby complete a circuit to said coil.

4. In an ignition dynamo, a magnet, a rotor having a shaft supported in the poles said rotor shaft, a normally fixed carrying structure having poles spaced apart from said rotor and adapted to receive flux therefrom, a coil on said structure, and circuit connections between said coil and distributer passing through said magnet, but insulated therefrom.

5. In an ignition dynamo, a magnet, a rotor and shaft therefor, a distributer on said rotor shaft, a coil carrying structure, a coil on said structure, circuit connections between said coil and distributer passing through said magnet, and an insulating bushing in said magnet surrounding said circuit connection whereby the same is positioned in operative relation to said coil.

6. In an ignition dynamo, a magnet, a rotor and shaft therefor, a distributer on said rotor shaft, a coil carrying structure, a coil on said structure, circuit connections between said coil and distributer passing through said magnet and insulated therefrom, and an insulating bushing in said magnet having a flange adapted to cover the inner face of said magnet adjacent the opposed face of said coil, substantially as described.

7. In an ignition dynamo, a magnet, a rotor and shaft therefor, a distributer on said rotor shaft, a coil carrying structure, a coil on said structure, a terminal plate on said coil, a circuit terminal on said plate, and circuit connections between said plate and distributer, said connections including brush contacts.

8. In an ignition dynamo, a magnet, a rotor and shaft therefor, a distributer on said rotor shaft, interrupter mechanism operated by said shaft, a normally fixed coil carrying structure having poles spaced apart from said rotor and adapted to receive flux therefrom, a coil on said structure and circuit connections between said coil, distributer, and interrupter.

9. In an ignition dynamo, a magnet, a rotor and shaft therefor, a distributer on said rotor shaft, interrupter mechanism operated by said shaft, a coil carrying structure, a coil on said structure, a circuit connection between said coil and distributer passing through said magnet but insulated therefrom, and a circuit connection between said coil and interrupter passing below one of said magnet poles.

10. In an ignition dynamo, a magnet, a rotor and shaft therefor projecting outside said magnet through the poles thereof, a distributer on said shaft outside said magnet, interrupter mechanism outside said magnet having poles spaced apart from said rotor, a coil on said structure, and circuit connections from said coil to said distributer and interrupter.

11. In an ignition dynamo, a magnet, a rotor and shaft therefor, a distributer on said rotor shaft, a coil carrying structure, a coil on said structure positioned above said rotor, means connecting said coil and distributer and brushes carried by said means in slidable connection with said coil and distributer.

12. In an ignition dynamo, a magnet, a rotor between the poles of said magnet having magnetizable members of opposite and permanent polarity, a shaft for said rotor extending outwardly from said magnet poles, and high tension distributer mechanism including a revolving segment and stationary members in contact therewith, positioned about said shaft.

13. In an ignition dynamo, a magnet, a rotor, a shaft for said rotor at substantially right angles to the open sides of said magnet and projecting outside the poles thereof, a coil carrying structure supported by said magnet in the space between the sides thereof, a coil on said structure, a distributer on said rotor shaft, and circuit connections between said coil and distributer.

14. In an ignition dynamo, a magnet, a rotor, a shaft for said rotor at substantially right angles to the open sides of said magnet and projecting outside the poles thereof, a coil carrying structure supported in the space between the sides of said magnet, a coil on said structure, a distributer on the rotor shaft outside the magnet, and circuit connections between said coil and distributer, said connections including a conductor passing through the side of said magnet, but insulated therefrom.

15. In an ignition dynamo, a magnet, a rotor having a shaft supported in the poles of said magnet, a plate outside one lateral face of the magnet and an oil tube communicating with said plate and passing through said magnet, and adapted to deliver oil to said rotor.

16. In an ignition dynamo, a magnet, a rotor having a shaft supported in the poles thereof, a housing surrounding and inclosing said rotor and movable about the axis thereof, a trough in the top of said housing having an aperture communicating with the interior thereof, and means for delivering oil to said trough.

17. In an ignition dynamo, a magnet, a rotor supported in the poles thereof, plates adjacent the lateral surfaces of said magnet poles and a cover extending across the top of said magnet and engaging the upper portions of said plates.

18. In an ignition dynamo, a magnet, a rotor having a shaft supported in the poles of said magnet, a distributer on said shaft, a coil within the space inclosed by said magnet, a circuit connection between said coil and distributer, and a one piece insulating casing for said circuit connection.

19. In an ignition dynamo, a magnet, a rotor having a shaft supported in the poles of said magnet, a distributer on said shaft, a coil within the space inclosed by said magnet, an L-shaped one piece circuit connector between said coil and distributer, and a one piece insulating casing for said connector.

20. In an ignition dynamo, a magnet, a coil within the space inclosed by said magnet, a rotor and shaft therefor, a distributer on said rotor shaft, a circuit connection between said coil and distributer, and a casing surrounding and inclosing said connection and distributer.

21. In an ignition dynamo, a normally stationary coil, a rotor shaft, contacts, and means carried by said rotor shaft whereby said contacts are alternately connected to said coil, substantially as described.

22. In an ignition dynamo, distributer mechanism comprising a rotor shaft carrying a distributer spool, a circuit connection leading from a high tension coil to said spool, an end plate, insulation for said circuit connection supported in said end plate, a cover inclosing said circuit connection and distributer spool, and contacts adapted to engage said distributer spool carried on said cover and insulated therefrom.

23. In an ignition dynamo, distributer mechanism comprising a rotor shaft carrying a distributer spool, a high tension coil movable about the axle of said shaft for timing purposes, a circuit connection between said high tension coil and said spool, insulation for said circuit connection supported in said end plate, a cover inclosing said circuit connection and distributer spool, and contacts adapted to engage said distributer carried on said cover and insulated therefrom.

24. In an ignition dynamo, a magnet, a rotor mounted between the poles of said magnet, a shaft for said rotor, a high tension distributer mounted on said shaft, a coil supported above said rotor, a circuit connection between said coil and distributer, an end plate, means for insulating said circuit connection from said end plate, a cover for said circuit connection and distributer, contacts mounted on said cover and adapted to engage said distributer, and cables connected to said contacts.

25. In an ignition dynamo, a magnet, a rotor mounted between the poles of said magnet, a shaft for said rotor, a high tension distributer mounted on said shaft, a coil supported above said rotor, a circuit connection between said coil and distributer, an end plate, means for insulating said circuit connection from said end plate, a cover for said circuit connection and distributer, contacts mounted on said cover and adapted to engage said distributer, cables connected to said terminals, and means comprising soft rubber nipples surrrounding said cables and terminal supports, whereby ingress of dirt and moisture is prevented.

26. In an ignition dynamo, a rotor comprising elements of permanent and opposite polarity, a shaft for said rotor, a distributer mounted on said shaft, an end plate, a contact secured to said end plate and adapted to bear on said distributer, a cover for said circuit connection and distributer, a pair of contacts secured to said cover and adapted to bear on said distributer, and means for securing said cover to said end plate.

27. In an ignition dynamo, generating windings, a rotor and core structure for the windings, a base carrying the same, magnets forming a bridge extending over and inclosing all of said parts and having ends resting upon the base, side plates clamped to the magnets and the base and covering the side openings of the magnets, distributer mechanism adjacent one side the magnets, a casing inclosing said distributer mechanism, and an electrical connection between said distributer and generating coil.

28. In an ignition dynamo, magnets, a coil carrying structure having adjustable poles, a coil on said structure, means associated with the magnets for directing flux therefrom through said adjustable poles alternately and oppositely, a high tension distributer driven with said means, connections between said coil and distributer, and means connected to said coil carrying structure and adapted when moved to turn the same so as to effect an angular displacement of said adjustable poles in relation to said flux directing means so as to advance and retard the spark and simultaneously move said coil in relation to said distributer without interrupting the electrical connection to the same.

29. In an ignition dynamo, magnets, a coil carrying structure having adjustable poles, a coil on said structure, means associated with the magnets for directing flux therefrom through said adjustable poles alternately and oppositely, a high tension distributer driven with said means, connections between said coil and distributer, and means connected to said coil carrying structure and adapted when moved to turn the same so as to effect an angular displacement of said adjustable poles in relation to said flux directing means so as to advance and retard the spark and simultaneously move said coil in relation to said distributer without moving any of the parts thereof.

30. In an ignition dynamo, magnets, a coil carrying structure having adjustable poles, a coil on said structure, means supported by said magnets for directing the flux therefrom through said secondary poles alternately and oppositely, a distributer associated with said flux directing means and movable therewith, a casing surrounding and including all of the before mentioned parts, means external said casing connected to said coil carrying structure and adapted when moved to turn the same so as to effect an angular displacement of said adjustable poles, and a connection between said coil and distributer, including means whereby the continuity of the circuit between said coil and distributer is always maintained regardless of the angular position of said coil.

31. In an ignition dynamo, field magnets, side plates, an adjustable generating coil in the space within the magnets, insulation mounted inside the magnets and between the side plates, a fixed contact on said insulation, and a movable contact secured to the coil and adapted to travel over and maintain circuit connection with the fixed contact throughout the arc of adjustment of the generating coil, said movable contact being positioned on the side of said coil adjacent said insulation.

32. In an ignition dynamo, magnets, a coil carrying structure, a coil on said structure, means associated with said magnet for directing the flux therefrom through said coil alternately and oppositely, a casing inclosing all of said parts, a distributer mounted external of said casing, a supplemental casing for said distributer, interrupter mechanism mounted on the opposite side of the dynamo from said interrupter and axially alined therewith, and a casing for said interrupter.

In testimony whereof I hereunto affix my signature.

CHARLES THOMAS MASON.